(12) United States Patent
Huang

(10) Patent No.: US 11,818,220 B2
(45) Date of Patent: Nov. 14, 2023

(54) INFORMATION PROCESSING METHOD, DEVICE AND STORAGE MEDIUM

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Sheng Huang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 17/899,170

(22) Filed: Aug. 30, 2022

(65) Prior Publication Data

US 2023/0008070 A1 Jan. 12, 2023

Related U.S. Application Data

(63) Continuation of application No. PCT/CN2022/083886, filed on Mar. 30, 2022.

(30) Foreign Application Priority Data

Apr. 16, 2021 (CN) .......................... 202110411293.2

(51) Int. Cl.
*H04L 67/141* (2022.01)
*H04L 9/40* (2022.01)

(52) U.S. Cl.
CPC ........ *H04L 67/141* (2013.01); *H04L 63/0838* (2013.01)

(58) Field of Classification Search
None
See application file for complete search history.

(56) References Cited

U.S. PATENT DOCUMENTS 10,320,965 B2 * 6/2019 Chu .................. H04M 1/72436
11,237,791 B2 * 2/2022 Guo ................. H04N 21/25808
(Continued)

FOREIGN PATENT DOCUMENTS

| CN | 109918034 A | 6/2019 |
| CN | 110691275 A | 1/2020 |

(Continued)

OTHER PUBLICATIONS

International Search Report issued in corresponding international application No. PCT/CN2022/083886, dated Jun. 28, 2022, 4 pages.

*Primary Examiner* — Quang N Nguyen
(74) *Attorney, Agent, or Firm* — BAYES PLLC

(57) ABSTRACT

An information processing method, a device, and a storage medium, which relates to a screen transmission technology, are provided. The method includes: in response to a first operation acting on characters, displaying the characters in an input box, where the input box is an input box of a screen transmission application; determining a target screen-transmission code in candidate screen-transmission codes stored in a screen-transmission sending end according to input characters, where the number of characters contained in the target screen-transmission code is greater than the number of the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end; displaying the target screen-transmission code in the input box.

8 Claims, 12 Drawing Sheets

(56) References Cited

U.S. PATENT DOCUMENTS

| | | | |
|---|---|---|---|
| 2014/0362096 A1 | 12/2014 | Otsuka | |
| 2015/0161767 A1* | 6/2015 | Monden | G06T 3/60 |
| | | | 345/428 |
| 2023/0052877 A1* | 2/2023 | Zhang | G06F 3/04162 |

FOREIGN PATENT DOCUMENTS

| | | |
|---|---|---|
| CN | 111459433 A | 7/2020 |
| CN | 111615220 A | 9/2020 |
| CN | 112242980 A | 1/2021 |
| CN | 306279015 S | 1/2021 |
| CN | 112565842 A | 3/2021 |

* cited by examiner

INFORMATION PROCESSING METHOD, DEVICE AND STORAGE MEDIUM

CROSS-REFERENCE TO RELATED APPLICATIONS

The present application is a continuation of International Application No. PCT/CN2022/083886, filed on Mar. 30, 2022, and claims the benefit of priority to China Patent Application No. CN202110411293.2, filed on Apr. 16, 2021, the contents of which are incorporated herein by reference in their entireties.

TECHNICAL FIELD

The present disclosure relates to the field of screen transmission technology, in particular to an information processing method, a device, and a storage medium.

BACKGROUND

With the continuous development of technology, various new technologies have emerged, such as screen transmission technology. Through the screen transmission technology, content displayed on a screen-transmission sending end may be transmitted to a screen-transmission receiving end, and may be displayed by the screen-transmission receiving end. For example, content displayed on a computer may be transmitted to an interactive white board for display. Before screen transmission, the screen-transmission sending end is required to establish a connection with the screen-transmission receiving end.

In a traditional connection mode, a user needs to manually input a screen-transmission code of the screen-transmission receiving end at the screen-transmission sending end, so that the screen-transmission sending end reversely parses an IP address of the screen-transmission receiving end based on the screen-transmission code, and establishes a connection with the screen-transmission receiving end according to the IP address.

However, because IP addresses have a large range, in order to make the screen-transmission code and the IP address in a one-to-one correspondence, the screen-transmission code usually has a relatively complex composition, resulting in the user manual input slow and error-prone.

SUMMARY

The present disclosure provides an information processing method, a device, and a storage medium, to rapidly and accurately input a screen-transmission code.

In a first aspect, an embodiment of the present disclosure provides an information processing method applied to a screen-transmission sending end, the method including: in response to a first operation acting on characters, displaying the characters in an input box, where the input box is an input box of a screen transmission application; determining, according to input characters, a target screen-transmission code out of candidate screen-transmission codes stored in the screen-transmission sending end, where the number of characters contained in the target screen-transmission code is greater than the number of the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end; displaying the target screen-transmission code in the input box; parsing the target screen-transmission code to obtain an IP address of the screen-transmission receiving end; establishing a connection with the screen-transmission receiving end according to the IP address; and sending screen transmission data to the screen-transmission receiving end.

In a possible implementation, determining the target screen-transmission code out of the candidate screen-transmission codes stored in the screen-transmission sending end according to the input characters may include: if the number of candidate screen-transmission codes containing the input characters in the candidate screen-transmission codes stored in the screen-transmission sending end is one, determining that the candidate screen-transmission code containing the input characters is the target screen-transmission code.

In a possible implementation, determining the target screen-transmission code out of the candidate screen-transmission codes stored in the screen-transmission sending end according to the input characters may include: displaying at least one of the candidate screen-transmission codes containing the input characters in the candidate screen-transmission codes stored in the screen-transmission sending end; and in response to a second operation acting on the target screen-transmission code, determining the target screen-transmission code.

In a possible implementation, before displaying the at least one of the candidate screen-transmission codes containing the input characters in the candidate screen-transmission codes stored in the screen-transmission sending end, the method may further include: determining a character string according to the input characters and an input order of the input characters; and determining that a screen-transmission code containing the character string in the candidate screen-transmission codes stored in the screen-transmission sending end is the candidate screen-transmission code containing the input characters.

In a possible implementation, the information processing method may further include: after receiving the beacon from the screen-transmission receiving end, accessing a local area network according to a network parameter carried by the beacon, where the network parameter includes a service set identifier (SSID), a password, and so on.

In a possible implementation, the beacon carries an IP address of the screen-transmission receiving end. At this point, sending the screen transmission data to the screen-transmission receiving end may further include: after obtaining the IP address of the screen-transmission receiving end, comparing the IP address of the screen-transmission receiving end and the IP address of the screen-transmission receiving end carried by the beacon to determine whether they are the same; and if so, sending the screen transmission data to the screen-transmission receiving end. In this implementation, the screen-transmission sending end checks whether an IP address obtained based on the target screen-transmission code is the IP address of the screen-transmission receiving end.

In a possible implementation, sending the screen transmission data to the screen-transmission receiving end may include: sending the target screen-transmission code to the screen-transmission receiving end to obtain a check result of the target screen-transmission code; and if the check result is that a check passes, sending the screen transmission data to the screen-transmission receiving end. In this implementation, the screen-transmission receiving end checks whether the target screen-transmission code from the screen-transmission sending end is the screen-transmission code of the screen-transmission receiving end.

In a second aspect, an embodiment of the present disclosure provides an information processing method applied to a screen-transmission receiving end. The information processing method includes: in response to a startup operation acting on a screen transmission application, triggering a display module to display a screen-transmission code corresponding to the screen-transmission receiving end, so that a user inputs characters at a screen-transmission sending end based on the screen-transmission code; sending a beacon to the screen-transmission sending end, where the beacon includes the screen-transmission code; in response to receiving a connection establishment request from the screen-transmission sending end, establishing a connection with the screen-transmission sending end, where the connection establishment request is sent after the screen-transmission sending end automatically complements the screen-transmission code as a target screen-transmission code based on input characters, and the number of characters contained in the target screen-transmission code is greater than the number of the input characters; and receiving screen transmission data from the screen-transmission sending end.

In a possible implementation, receiving the screen transmission data from the screen-transmission sending end may include: receiving the target screen-transmission code from the screen-transmission sending end; checking the target screen-transmission code to obtain a check result of whether a check passes; sending the check result to the screen-transmission sending end; and if the check result is that the check passes, receiving the screen transmission data from the screen-transmission sending end, which includes audio data, video data, and/or the like.

In a third aspect, an embodiment of the present disclosure provides an information processing device applied to a screen-transmission sending end. The information processing device includes:

- a processing module, configured to trigger a display module to display characters in an input box in response to a first operation acting on the characters, where the input box is an input box of a screen transmission application; and determining, according to input characters, a target screen-transmission code out of candidate screen-transmission codes stored in the screen-transmission sending end. where the number of characters contained in the target screen-transmission code is greater than the number of the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end;
- the display module is further configured to display the target screen-transmission code in the input box;
- the processing module is further configured to parse the target screen-transmission code to obtain an IP address of the screen-transmission receiving end, and is configured to establish a connection with the screen-transmission receiving end according to the IP address; and
- a transceiver module, configured to send screen transmission data to the screen-transmission receiving end.

In a possible implementation, the processing module determining the target screen-transmission code out of the candidate screen-transmission codes stored in the screen-transmission sending end according to the input characters includes: when the number of candidate screen-transmission codes containing the input characters in the candidate screen-transmission codes stored in the screen-transmission sending end is one, determining that the candidate screen-transmission code containing the input characters is the target screen-transmission code.

In a possible implementation, the processing module determining the target screen-transmission code out of the candidate screen-transmission codes stored in the screen-transmission sending end according to the input characters includes: displaying at least one of the candidate screen-transmission codes containing the input characters in the candidate screen-transmission codes stored in the screen-transmission sending end; and in response to a second operation acting on the target screen-transmission code, determining the target screen-transmission code.

In a possible implementation, the processing module is further configured to: before the display module displays the at least one of the candidate screen-transmission codes containing the input characters in the candidate screen-transmission codes stored in the screen-transmission sending end, determine a character string according to the input characters and an input order of the input characters; and determine that a screen-transmission code containing the character string in the candidate screen-transmission codes stored in the screen-transmission sending end is the candidate screen-transmission code containing the input characters.

In a possible implementation, the transceiver module is further configured to: after receiving the beacon from the screen-transmission receiving end, access a local area network according to a network parameter carried by the beacon, where the network parameter includes a SSID, a password, and so on.

In a possible implementation, the beacon carries an IP address of the screen-transmission receiving end. At this point, the transceiver module sending the screen transmission data to the screen-transmission receiving end may include: after obtaining the IP address of the screen-transmission receiving end, comparing the IP address of the screen-transmission receiving end and the IP address of the screen-transmission receiving end carried by the beacon to determine whether they are the same; if so, sending the screen transmission data to the screen-transmission receiving end. In this implementation, the screen-transmission sending end checks whether an IP address obtained based on the target screen-transmission code is the IP address of the screen-transmission receiving end.

In a possible implementation, the transceiver module sending the screen transmission data to the screen-transmission receiving end may include: sending the target screen-transmission code to the screen-transmission receiving end to obtain a check result of the target screen-transmission code; and if the check result is that a check passes, sending the screen transmission data to the screen-transmission receiving end. In this implementation, the screen-transmission receiving end checks whether the target screen-transmission code from the screen-transmission sending end is the screen-transmission code of the screen-transmission receiving end.

In a fourth aspect, an embodiment of the present disclosure provides an information processing device applied to a screen-transmission receiving end. The information processing device includes:

- a processing module, configured to trigger a display module to display a screen-transmission code corresponding to the screen-transmission receiving end in response to a startup operation acting on a screen transmission application, so that a user inputs characters at a screen-transmission sending end based on the screen-transmission code;

a transceiver module, configured to send a beacon to the screen-transmission sending end, and to receive a connection establishment request from the screen-transmission sending end, where the beacon includes the screen-transmission code of the screen-transmission receiving end, the connection establishment request is sent after the screen-transmission sending end automatically complements the screen-transmission code as a target screen-transmission code based on input characters, and the number of characters contained in the target screen-transmission code is greater than the number of the input characters;

the processing module is further configured to establish a connection with the screen-transmission sending end in response to receiving the connection establishment request; and the transceiver module is further configured to receive screen transmission data from the screen-transmission sending end.

In a possible implementation, the transceiver module receiving the screen transmission data from the screen-transmission sending end includes: receiving the target screen-transmission code from the screen-transmission sending end; checking the target screen-transmission code to obtain a check result of whether a check passes; sending the check result to the screen-transmission sending end; and if the check result is that the check passes, receiving the screen transmission data from the screen-transmission sending end, which includes audio data, video data, and/or the like.

In a fifth aspect, an embodiment of the present disclosure provides an electronic apparatus including:

a memory, configured to store program instructions; and a processor, configured to invoke and execute the program instructions in the memory to perform the information processing method according to any one of the first aspect or the second aspect.

In a sixth aspect, an embodiment of the present disclosure provides a computer-readable storage medium, where the computer-readable storage medium stores program instructions, and the program instructions, when executed, implement the information processing method according to any one of the first aspect or the second aspect.

In a seventh aspect, an embodiment of the present disclosure provides a computer program product including program instructions, where the program instructions, when executed, implement the information processing method according to any one of the first aspect or the second aspect.

An embodiment of the present disclosure provides an information processing method, a device, and a storage medium, where a screen-transmission sending end is configured to: display characters in an input box in response to a first operation acting on the characters, where the input box is an input box of a screen transmission application; determine a target screen-transmission code out of candidate screen-transmission codes stored in the screen-transmission sending end according to input characters, where the target screen-transmission code contains more characters than the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end; display the target screen-transmission code in the input box; parse the target screen-transmission code to obtain an IP address of the screen-transmission receiving end; establish a connection with the screen-transmission receiving end according to the IP address; and send screen transmission data to the screen-transmission receiving end. In one aspect, according to the present disclosure, the target screen-transmission code can be determined when a user inputs first N characters of the target screen-transmission code, and the first N characters of the target screen-transmission code are displayed in the input box. N is less than the number of characters contained in the target screen-transmission code, thereby realizing rapid and accurate input of the screen-transmission code. In another aspect, since the screen-transmission receiving end transmits the screen-transmission code of the screen-transmission receiving end to the screen-transmission sending end through the beacon, the user does not need to judge whether the screen-transmission sending end and the screen-transmission receiving end are in the same local area network, that is, even if the screen-transmission sending end and the screen-transmission receiving end are not in the same local area network, the screen-transmission code can be automatically complemented at the screen-transmission sending end.

BRIEF DESCRIPTION OF THE DRAWINGS

In order to describe the technical solutions in the embodiments of the present disclosure or the related art more clearly, the accompanying drawings required in the description of the embodiments or the related art will be briefly introduced below. Obviously, the accompanying drawings in the description below are merely some embodiments of the present disclosure, and for those of ordinary skill in the art, other drawings may be obtained from these drawings without creative efforts.

DETAILED DESCRIPTION

Figure 1A:
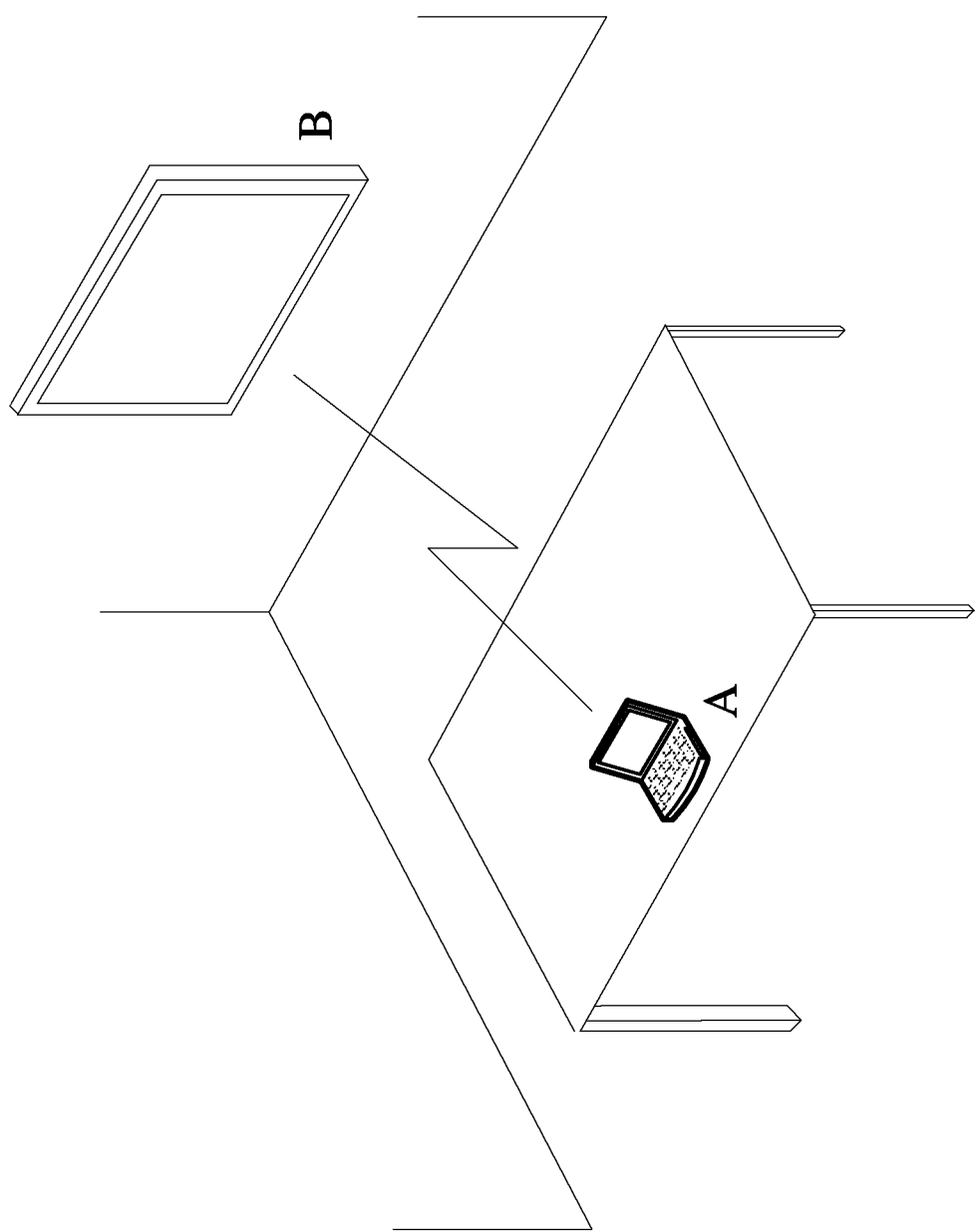
FIG. 1a is an example diagram of an application scenario according to an embodiment of the present disclosure.

The technical solutions in the embodiments of the present disclosure will be described below with reference to the accompanying drawings in the embodiments of the present disclosure. Obviously, the described embodiments are only some but not all of the embodiments of the present disclosure. Based on the embodiments of the present disclosure, all other embodiments obtained by those of ordinary skill in the art without creative efforts shall fall within the scope of protection of the present disclosure.

The terms "first" and "second" in the description, claims and drawings of the embodiments of the present disclosure are used to distinguish similar objects, and are not necessarily used to describe a specific order or sequence. It should be understood that the data so used may be interchanged under appropriate situations so that the embodiments of the present disclosure described herein, for example, can be implemented in an order other than those illustrated or described herein. In addition, the terms "include" and "have," and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

It should be understood that, the term "and/or" as used herein is only an association relationship that describes associated objects, and indicates that three relationships may exist. For example, A and/or B may indicate three cases: A exists alone, A and B exist simultaneously, and B exists alone. "/" indicates a relationship of "or".

Wireless screen transmission is also known as wireless co-screen, flying screen, and screen sharing. Specifically, it is to display a screen picture of a screen-transmission sending end on the screen of a screen-transmission receiving end "in real time" through screen transmission technology. The screen-transmission sending end, for example, may be an apparatus such as a mobile phone, a tablet, a notebook, or a computer; and the screen-transmission receiving end, for example, may be an apparatus such as an interactive white board, a notebook, a computer, a TV, an integrated machine, or a projector.

Content of the picture can include various media information and real-time operation pictures, such as documents, videos, photos, etc. As long as a connection (wired connection and/or wireless connection) is established between the screen-transmission sending end and the screen-transmission receiving end, the screen picture of the screen-transmission sending end can be transmitted to the screen of the screen-transmission receiving end for display. For example, both the screen-transmission sending end and the screen-transmission receiving end are installed with a screen transmission application.

Typically, the size of the screen-transmission code is relatively fixed, such as a 6-bit screen-transmission code or an 8-bit screen-transmission code. In a specific application, the screen-transmission code is obtained by processing the IP address with a screen-transmission-code generation algorithm, and the screen-transmission code and the IP address are in a one-to-one correspondence. Considering that the IP address assigned to the screen-transmission receiving end is different each time, the screen-transmission code corresponding to the same screen-transmission receiving end also changes as the IP address changes. In this way, the user needs to manually input the screen-transmission code of the screen-transmission receiving end on the screen-transmission sending end before transmitting the screen picture of the screen-transmission sending end to the screen-transmission receiving end. However, IP addresses in the local area network have a large range, in order to make the screen-transmission code and the IP address in a one-to-one correspondence, the screen-transmission code has a relatively complex composition, for example, the screen-transmission code includes English letters and numbers, etc., resulting in slow and error-prone manual input by the user when the user manually inputs the screen-transmission code.

In addition, at present, the discovery of the screen-transmission sending end and the screen-transmission receiving end mostly adopts the discovery mode of the local area network, such as the Multicast Domain Name System (MDNS), etc. For the user, the user does not know whether the screen-transmission sending end and the screen-transmission receiving end are in the same local area network, so there exists a situation in which the screen-transmission sending end cannot receive the screen-transmission code sent by the screen-transmission receiving end.

Based on the above problems, the present disclosure provides an information processing method, a device, and a storage medium. Through the transmission of the screen-transmission code by a beacon and semi-automatic input, the input efficiency of the screen-transmission code is increased, and at the same time, the error probability of the screen-transmission code is reduced, that is, rapid and accurate input of the screen-transmission code can be realized.

Next, an application scenario involved in the present disclosure is described by way of example.

FIG. 1a is an example diagram of an application scenario according to an embodiment of the present disclosure. As shown in FIG. 1a:

For example, an electronic apparatus A and an electronic apparatus B needs to perform screen sharing by the screen transmission technology, where the electronic apparatus A is a screen-transmission sending end and the electronic apparatus B is a screen-transmission receiving end. By the information processing method provided in the present disclosure, the screen-transmission code of the electronic apparatus B can be rapidly and accurately input into the electronic apparatus A. Further, the electronic apparatus A establishes a connection with the electronic apparatus B according to the screen-transmission code, and performs screen transmission processing.

Figure 1B:
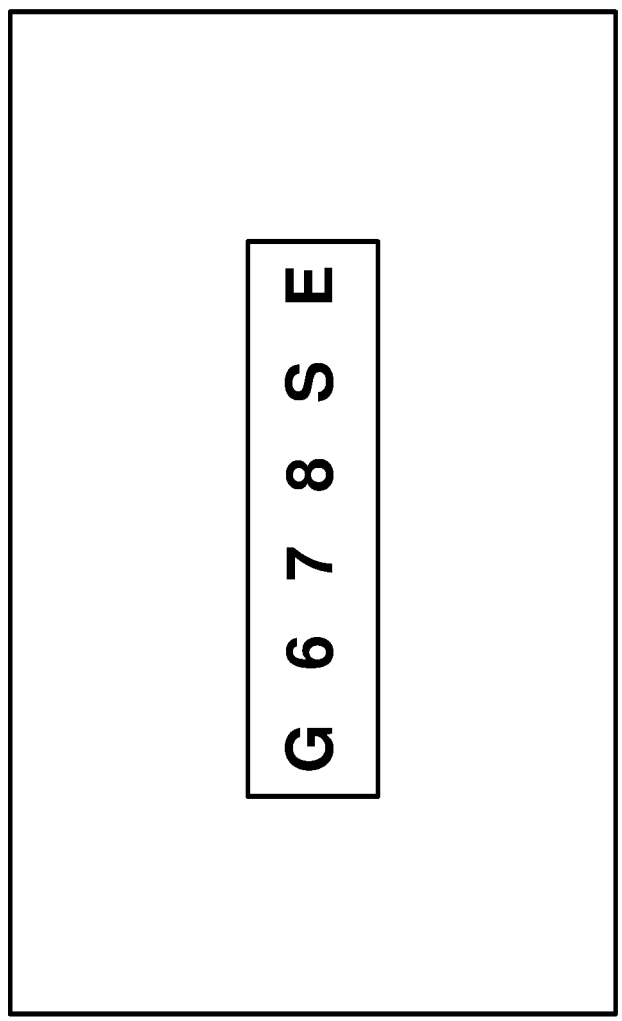
FIG. 1b is an example diagram of an input interface of screen-transmission code according to the embodiment of the present disclosure.

In the example shown in FIG. 1a, the electronic apparatus A takes a notebook as an example, and the electronic apparatus B takes an interactive white board as an example, but the present disclosure is not limited thereto. The interactive white board is integrated with any one or more of functions such as a projector, an electronic white board, a screen, audio, a TV, and a video conference terminal. Specifically, the interactive white board is installed with a screen transmission application, and when the user starts the screen transmission application, the interactive white board, in response to the startup operation acting on the screen transmission application, generates the screen-transmission code of the interactive white board based on the IP address, and displays the screen-transmission code on the screen of the interactive white board, as shown in FIG. 1b. After seeing the screen-transmission code, the user inputs the screen-transmission code on the screen transmission application interface of the notebook.

It should be noted that the screen-transmission sending end and the screen-transmission receiving end are relative concepts. In two electronic apparatus that perform wireless transmission through the screen transmission technology, one is the screen-transmission sending end, and the other is the screen-transmission receiving end. The screen-transmission sending end and the screen-transmission receiving end can be interchanged depending on actual situations. In general, there may be one or more screen-transmission sending ends, which is set according to a specific application scenario and is not limited in the embodiment.

Optionally, the screen transmission application may be pre-installed in the screen-transmission sending end and/or the screen-transmission receiving end, or may be downloaded from a third-party apparatus or server and installed and used when the screen-transmission sending end and/or the screen-transmission receiving end starts the screen transmission application. The third-party apparatus is not limited in the embodiment. Specifically, the screen transmission application is configured to acquire content displayed by the screen-transmission sending end as screen transmission data, and to instruct the screen-transmission receiving end to display the content. In an embodiment, a case in which the screen-transmission sending end and the screen-transmission receiving end are both installed with a screen transmission application is taken as an example for description. In this case, the screen transmission application of the screen-transmission sending end is configured to acquire the screen transmission data and send the screen transmission data directly or indirectly to the screen-transmission receiving end. In the case of indirect sending, the screen-transmission sending end may send the screen transmission data to the screen-transmission receiving end through a transfer device, which may be a wireless screen transmission device or other devices having a data transferring/processing function. The screen transmission application of the screen-transmission receiving end is configured to receive the screen transmission data, and to convert the screen transmission data into corresponding content, so as to facilitate display by the screen-transmission receiving end.

Figure 1C:
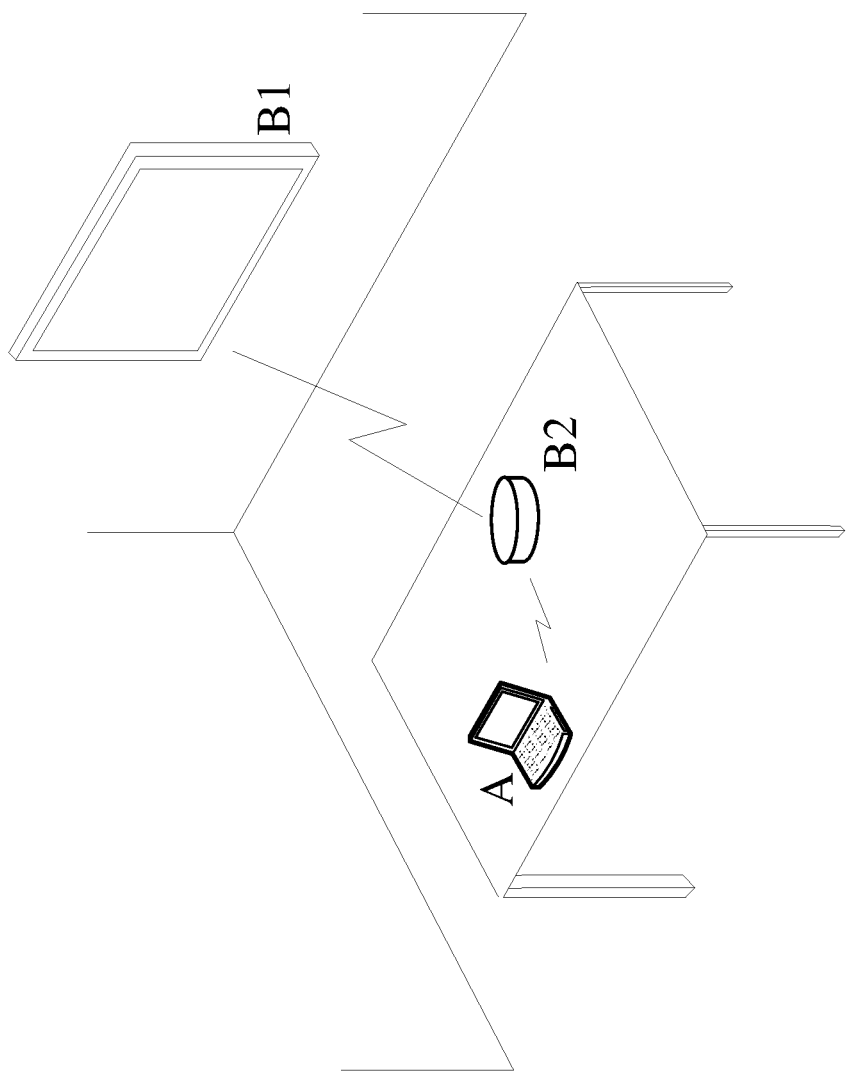
FIG. 1c is another example diagram of an application scenario according to an embodiment of the present disclosure.

Additionally, in the scenario shown in FIG. 1a, the screen-transmission receiving end is an interactive white board which is installed with a screen transmission application and is integrated with reception and display functions. In some embodiments, as shown in FIG. 1c, the screen-transmission receiving end may also include two mutually independent apparatus, i.e., a receiving apparatus B2 and a display apparatus B1, where the receiving apparatus is installed with a screen transmission application, and the display apparatus is configured to display a screen. For example, as shown in FIG. 1c, the receiving apparatus B2 may be specifically an electronic apparatus such as a receiving box that does not have a display function, and the display apparatus B1 may be an electronic apparatus such as a TV or a projector that has a display function.

In addition, considering that the resolution of the screen of the screen-transmission sending end is different from that of the screen-transmission receiving end, and the screen transmission data is acquired based on the resolution of the screen-transmission sending end. Therefore, in order to display the screen transmission data in the screen of the screen-transmission receiving end, the screen transmission application needs to determine a screen mapping relationship according to the resolutions of the screens of the screen-transmission sending end and the screen-transmission receiving end, and then to convert the screen transmission data according to the screen mapping relationship to obtain screen transmission content. It should be noted that, in the embodiment, the screen transmission content and the display content of the screen transmission data are substantially the same, but differing only in resolution.

An information processing method according to the present disclosure will be explained below with reference to specific embodiments.

Figure 2:
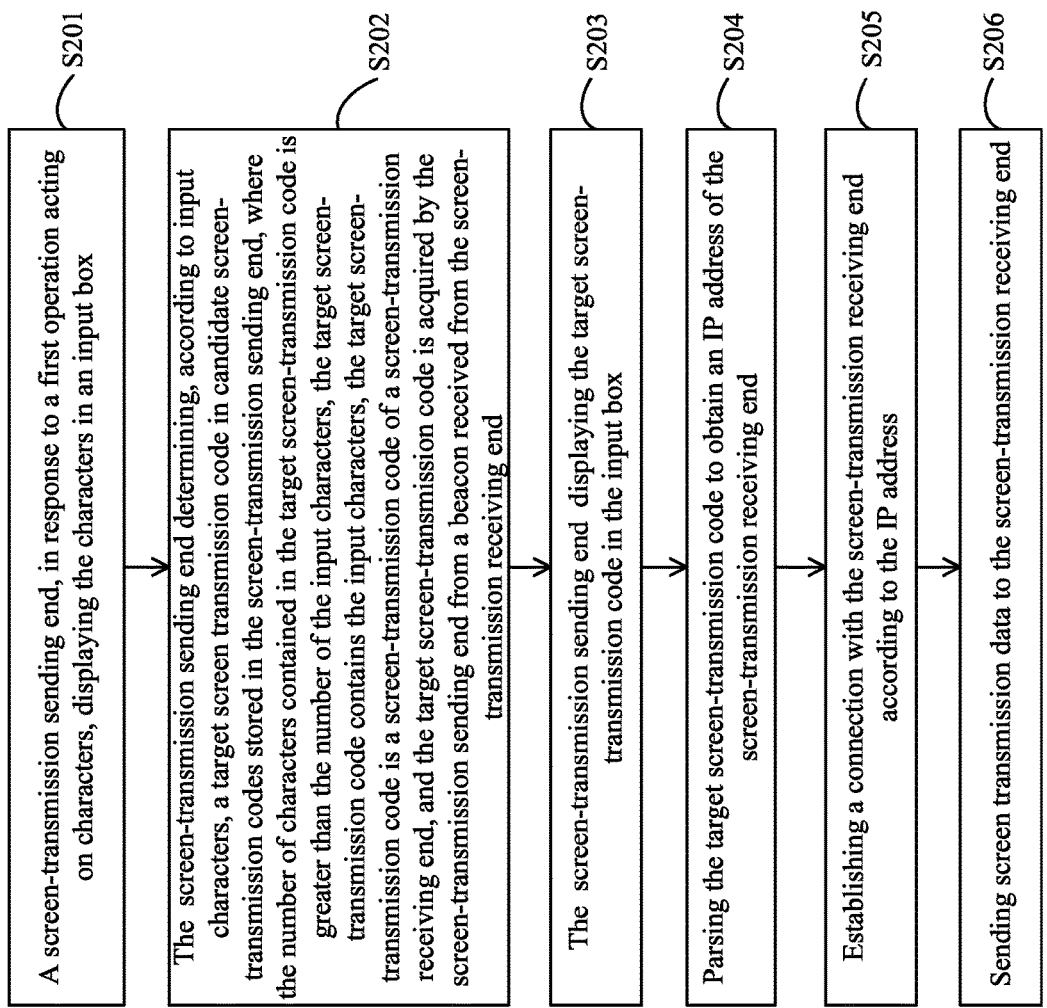
FIG. 2 is a flowchart of an information processing method according to an embodiment of the present disclosure.

FIG. 2 is a flowchart of an information processing method according to an embodiment of the present disclosure. The information processing method may be executed by an information processing device, which may be implemented by software and/or hardware. In the application scenario shown in FIG. 1a or FIG. 1c, the information processing device may be an electronic apparatus A or a chip or circuit of the electronic apparatus A.

Referring to FIG. 2, the information processing method according to this embodiment includes:

S201: a screen-transmission sending end, in response to a first operation acting on characters, displaying the characters in an input box.

Figure 3:
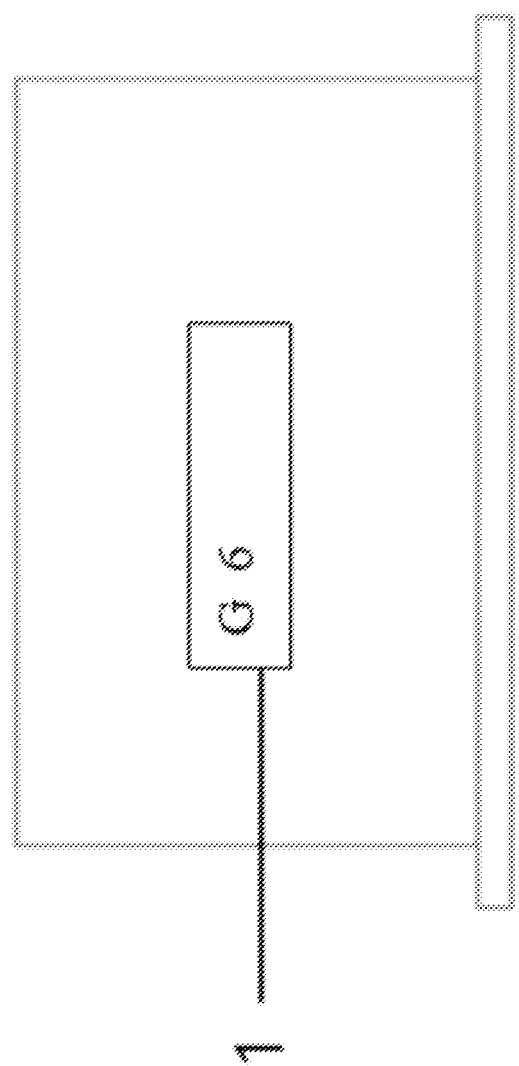
FIG. 3 is an example diagram of another input interface of screen-transmission code according to the embodiment of the present disclosure.

The input box therein is an input box of a screen transmission application. As shown in FIG. 3, a user starts the screen transmission application on the screen-transmission sending end, and the screen-transmission sending end responds to the operation and displays an input box 1. Content in the input box is editable, and the user can input characters contained in a target screen-transmission code in the input box through an input apparatus such as a virtual keyboard at the screen-transmission sending end, or a physical keyboard connected to the screen-transmission sending end. The operation therein that the user acts on the input apparatus is the first operation.

Taking the notebook shown in FIG. 1a as an example, when the target screen-transmission code is "G678SE," the user acts on two keys (i.e., the letter "G" and the number "6") contained in the keyboard of the notebook in sequence. After detecting the user's operation, the notebook displays characters "G6" indicated by the corresponding keys in the input box according to the sequence of input.

Figure 4:
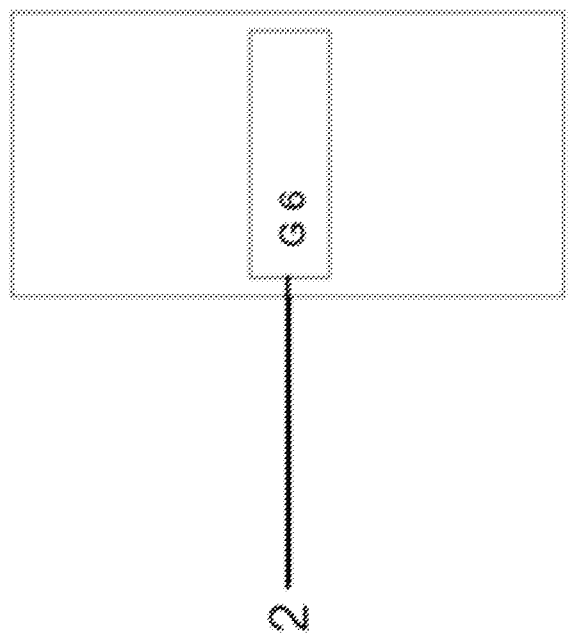
FIG. 4 is an example diagram of yet another input interface of screen-transmission code according to the embodiment of the present disclosure.

If the screen-transmission sending end is a mobile phone, as shown in FIG. 4, the input box on the mobile phone and its display content are similar to those in FIG. 3. In FIG. 4, the input box is identified as "2."

S202: the screen-transmission sending end determining, according to input characters, a target screen-transmission code in candidate screen-transmission codes stored in the screen-transmission sending end, where the target screen-transmission code contains more characters than the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end.

The screen-transmission sending end saves or acquires at least one of the candidate screen-transmission codes in advance, and the at least one candidate screen-transmission code may be a screen-transmission code that is previously input at the screen-transmission sending end or is contained in the beacon received by the screen-transmission sending end from the screen-transmission receiving end. The screen-transmission sending end matches the input characters in this screen transmission processing with the known screen-transmission codes, to determine the target screen-transmission code.

The transmission of the beacon therein is not limited by the local area network. In a practical application, the screen-transmission receiving end can broadcast the beacon after enabling a wireless access function, and the beacon carries information such as a screen-transmission code of the screen-transmission receiving end. Furthermore, as long as the moment of receiving the beacon by the screen-transmission sending end occurs before step S202, the embodiment of the present disclosure does not limit the sequence of the moment of receiving the beacon and the moment of performing step S201 by the screen-transmission sending end, and the two may be performed simultaneously.

For example, the number of target screen-transmission codes determined according to the input characters is at least one. In a specific implementation, the screen-transmission sending end determining the target screen-transmission code in the candidate screen-transmission codes stored in the screen-transmission sending end according to the input characters may include: if the number of candidate screen-transmission codes containing the input characters in the candidate screen-transmission codes stored in the screen-transmission sending end is one, determining that the candidate screen-transmission code is the target screen-transmission code. In another implementation, if the number of candidate screen-transmission codes containing the input characters is at least two, the user continues to manually input the remaining characters until the screen-transmission sending end can uniquely determine the target screen-transmission code according to the input characters.

Through this step, the target screen-transmission code can be determined after the user manually inputs only a small number of characters of the target screen-transmission code, thereby realizing a complete display of the target screen-transmission code in the input box. Compared with the implementation in which the user manually inputs each character contained in the target screen-transmission code one by one, the input efficiency is obviously increased, and the probability of error is relatively low.

S203: the screen-transmission sending end displaying the target screen-transmission code in the input box.

After determining the target screen-transmission code, the screen-transmission sending end may establish a connection with the screen-transmission receiving end according to the target screen-transmission code, and may check the target screen-transmission code and transmit screen transmission data. Specifically:

S204: parsing the target screen-transmission code to obtain an IP address of the screen-transmission receiving end.

Optionally, this step and S203 may be performed simultaneously, and the execution order of S203 and S204 is not limited in the embodiment of the present disclosure.

S205: establishing a connection with the screen-transmission receiving end according to the IP address.

For example, the screen-transmission sending end sends a connection establishment request to the screen-transmission receiving end to establish a connection with the screen-transmission receiving end.

S206: sending the screen transmission data to the screen-transmission receiving end.

The screen transmission data therein may include content currently displayed at the screen-transmission sending end, such as a picture, a video, and the like. Optionally, the screen transmission data may further include audio content currently played by the screen-transmission sending end.

It should also be noted that relevant descriptions of S204 to S206 can refer to the related technology, and will not be repeated here. Due to rapid and accurate input of the screen-transmission code, transmission delay of the screen transmission data can also be reduced in the embodiment of the present disclosure.

In an embodiment of the present disclosure, a screen-transmission sending end performs the following: displaying characters in an input box in response to a first operation acting on the characters, where the input box is an input box of a screen transmission application; determining a target screen-transmission code in candidate screen-transmission codes stored in the screen-transmission sending end according to input characters, where the target screen-transmission code contains more characters than the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end; displaying the target screen-transmission code in the input box, and parsing the target screen-transmission code to obtain an IP address of the screen-transmission receiving end; establishing a connection with the screen-transmission receiving end according to the IP address; and sending screen transmission data to the screen-transmission receiving end. In one aspect, according to the present disclosure, the target screen-transmission code can be determined when a user inputs first N characters of the target screen-transmission code, and the first N characters of the target screen-transmission code are displayed in the input box, where N is less than the number of characters contained in the target screen-transmission code, thereby realizing rapid and accurate input of the screen-transmission code. In another aspect, since the screen-transmission receiving end transmits the screen-transmission code of the screen-transmission receiving end to the screen-transmission sending end through the beacon, the user does not need to judge whether the screen-transmission sending end and the screen-transmission receiving end are in the same local area network, that is, even if the screen-transmission sending end and the screen-transmission receiving end are not in the same local area network, the screen-transmission code can be automatically complemented at the screen-transmission sending end.

On the basis of the above embodiment, since the number of target screen-transmission codes determined according to the input characters is at least one, at this point, the screen-transmission sending end may further display at least one of the candidate screen-transmission codes containing the input characters in the candidate screen-transmission codes stored in the screen-transmission sending end, and determine the target screen-transmission code in response to a second operation acting on the target screen-transmission code, where the at least one candidate screen-transmission code includes the target screen-transmission code. That is, the screen-transmission sending end determining the target screen-transmission code in the candidate screen-transmission codes stored in the screen-transmission sending end according to the input characters may include: displaying the at least one candidate screen-transmission code containing the input characters in the candidate screen-transmission codes stored in the screen-transmission sending end, where the at least one candidate screen-transmission code includes the target screen-transmission code; and determining the target screen-transmission code in response to a second operation acting on the target screen-transmission code.

Figure 5:
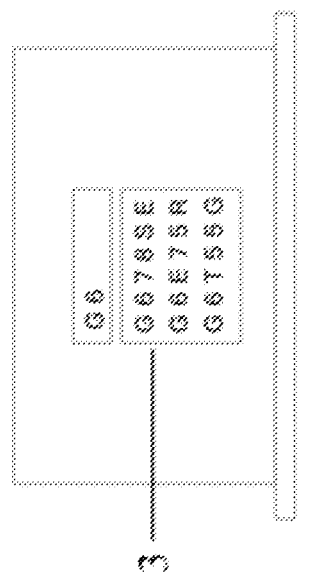
FIG. 5 is an example diagram of yet another input interface of screen-transmission code according to the embodiment of the present disclosure.
Figure 6:
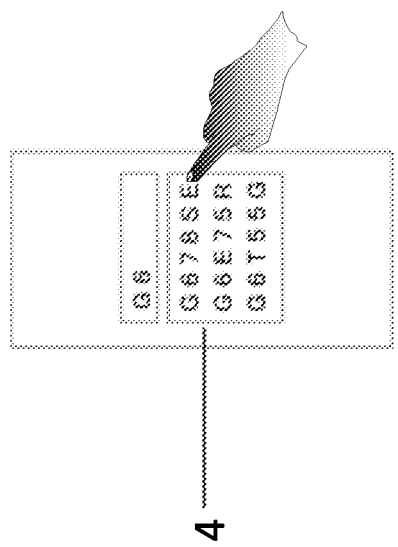
FIG. 6 is an example diagram of yet another input interface of screen-transmission code according to the embodiment of the present disclosure.

Still taking a case that the target screen-transmission code is "G678SE" as an example, after the user inputs "G6," the screen-transmission sending end displays, according to the input characters "G6," a candidate screen-transmission code containing "G6." For example, FIG. 5 shows a schematic diagram of an interface when the screen-transmission sending end is a notebook, where the reference numeral 3 is used to identify at least one of the candidate screen-transmission codes that is listed and displayed. FIG. 6 shows a schematic diagram of an interface when the screen-transmission sending end is a mobile phone, and the reference numeral 4 is used to identify at least one of the candidate screen-transmission codes that is listed and displayed. The candidate screen-transmission codes therein are "G678SE," "G6E75R," and "G6T55G," including the target screen-transmission code "G678SE."

At this point, the user can select from the listed candidate screen-transmission codes without having to continue to input the remaining characters. Specifically, the user may select the target screen-transmission code through a second operation, as shown in FIG. 6. Accordingly, the screen-transmission sending end determines the target screen-transmission code, and displays the target screen-transmission code in the input box.

In the embodiment of the present disclosure, the screen-transmission sending end performs the follows: displaying characters in an input box in response to a first operation acting on the characters, where the input box is an input box of a screen transmission application; displaying at least one of the candidate screen-transmission codes containing the input characters in the candidate screen-transmission codes stored in the screen-transmission sending end, where the at least one candidate screen-transmission code includes the target screen-transmission code; in response to a second operation acting on the target screen-transmission code, displaying the target screen-transmission code in the input box. According to the present disclosure, when the user inputs first N characters (a small number of characters) of the target screen-transmission code, at least one of the candidate screen-transmission codes including the target screen-transmission code can be matched, listed, and displayed for the user to select, where N is less than the number of characters contained in the target screen-transmission code, so that the user can select the target screen-transmission code by the second operation acting on the target screen-transmission code, and the screen-transmission sending end displays the target screen-transmission code in the input box in response to the second operation, thereby realizing rapid and accurate input of the screen-transmission code without manually inputting a complete and complex target screen-transmission code.

After a complete screen-transmission code is input in the input box of the screen-transmission sending end, the screen-transmission sending end establishes a connection with the screen-transmission receiving end. In the related art, after the user inputs the screen-transmission code, the user needs to wait 2-3 seconds for matching to know whether the screen-transmission code is correctly input or whether the screen-transmission sending end and the screen-transmission receiving end corresponding to the screen-transmission code are in the same local area network, thus the feedback is relatively slow. When the screen-transmission sending end and the screen-transmission receiving end corresponding to the screen-transmission code are not in the same local area network, the screen-transmission sending end cannot receive the screen-transmission code sent by the screen-transmission receiving end through the local area network. While in the present disclosure, the user can select an input screen-transmission code after inputting a small number of characters, and if the screen-transmission sending end cannot query a matched apparatus, it can confirm that the input is wrong or the network environment is abnormal, hence the feedback is more timely and more accurate, which greatly improves the human-computer interaction experience. And since the screen-transmission sending end obtains the screen-transmission code of the screen-transmission receiving end through a beacon, it is not limited by the fact that the screen-transmission sending end and the screen-transmission receiving end are in the same local area network.

In the above embodiment, before the screen-transmission sending end displays the at least one candidate screen-transmission code containing the input characters in the candidate screen-transmission codes stored in the screen-transmission sending end, the method may further include: determining a candidate screen-transmission code according to the input characters and an input order of the input characters. In one specific implementation, determining the candidate screen-transmission code according to the input characters and the input order of the input characters may include: determining a character string according to the input characters and the input order of the input characters; and determining that the screen-transmission code containing the character string in the candidate screen-transmission codes stored in the screen-transmission sending end is the candidate screen-transmission code containing the input characters.

It can be understood that the at least one candidate screen-transmission code listed and displayed at the screen-transmission sending end may be stored in the screen-transmission sending end in advance or may be acquired by the screen-transmission sending end from other apparatus in real time. In some embodiments, before determining that the screen-transmission code containing the character string is the candidate screen-transmission code containing the input characters, the information processing method may further include: receiving the beacon from the screen-transmission receiving end.

In some embodiments, the above information processing method may further include: after receiving the beacon, accessing a local area network according to a network parameter carried by the beacon, where the network parameter may include a SSID, a password, and so on. The local area network here may be a local area network connected to the screen-transmission receiving end, or may be a local area network using the screen-transmission receiving end as a hotspot, which is not limited in the embodiment of the present disclosure. When the local area network is a local area network using the screen-transmission receiving end as a hotspot, the user is required to enable a network sharing function or a function of working as a wireless access hotspot of the screen-transmission receiving end in advance.

Furthermore, the beacon carries the IP address of the screen-transmission receiving end. At this point, at S206, sending the screen transmission data to the screen-transmission receiving end may further include: after obtaining the IP address of the screen-transmission receiving end, comparing the IP address of the screen-transmission receiving end and the IP address of the screen-transmission receiving end carried by the beacon to determine whether they are the same; if so, sending the screen transmission data to the screen-transmission receiving end. In this implementation, the screen-transmission sending end checks whether an IP address obtained based on the target screen-transmission code is the same as the IP address of the screen-transmission receiving end, and if so, a check passes, and the screen-transmission sending end may send the screen transmission data to the screen-transmission receiving end.

In some embodiments, at S206, sending the screen transmission data to the screen-transmission receiving end may include: sending the target screen-transmission code to the screen-transmission receiving end to obtain a check result of the target screen-transmission code; and if the check result is that the check passes, sending the screen transmission data to the screen-transmission receiving end. In this implementation, the screen-transmission receiving end checks whether the target screen-transmission code from the screen-transmission sending end is the actual screen-transmission code of the screen-transmission receiving end, and if so, the check passes, and the screen-transmission sending end may send the screen transmission data to the screen-transmission receiving end.

Figure 7:
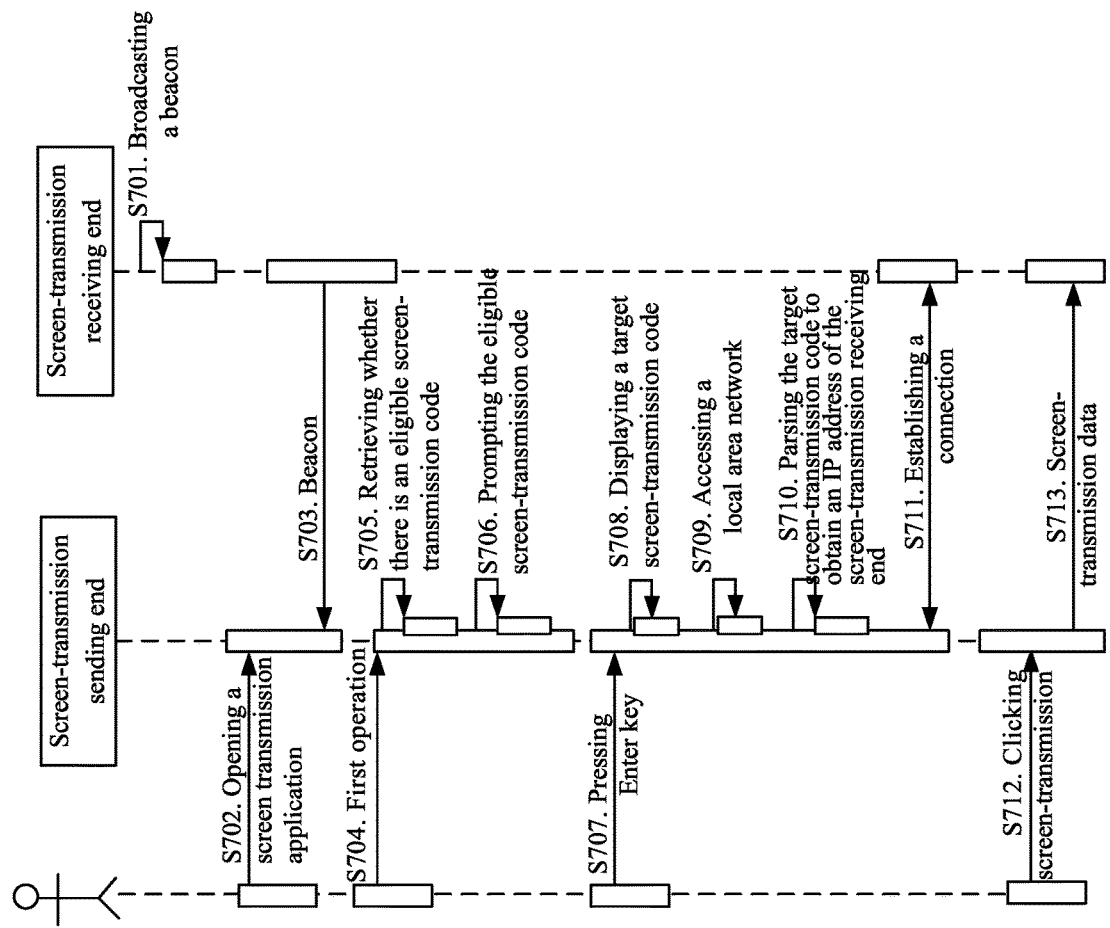
FIG. 7 is a diagram of an application instance of an information processing method according to an embodiment of the present disclosure.

For example, as shown in FIG. 7, a specific application instance of screen transmission is introduced:

S701: a screen-transmission receiving end broadcasting a beacon.

For example, after enabling a wireless hotspot function, the screen-transmission receiving end broadcasts the beacon.

S702: a user opening a screen transmission application at a screen-transmission sending end.

S703: in response to the operation of opening the screen transmission application by the user (i.e., detecting that the screen transmission application is opened), the screen-transmission sending end receiving the beacon.

In this example, the beacon may include the screen-transmission code, apparatus information of the screen-transmission receiving end, and network parameters. For example, the apparatus information may include, but not limited to, an apparatus type and/or an apparatus name of the screen-transmission receiving end; the network parameters may include, but not limited to, an IP address of the screen-transmission receiving end, a Wi-Fi name, a password, SSID, or a port, and the like.

S704: the user inputting a first operation acting on characters through an input apparatus such as a keyboard and/or a mouse to input the characters in an input box of the screen transmission application.

S705: the screen-transmission sending end displaying the characters in the input box in response to the first operation, and retrieving, according to the input characters, whether there is an eligible screen-transmission code.

This step is a step of determining the target screen-transmission code according to the input characters.

"Eligible" here can be understood as containing the input characters (i.e., the characters displayed in the input box).

If there is an eligible screen-transmission code, step S706 is performed. Optionally, if there is no eligible screen-transmission code, no relevant prompt will be given, and the user continues to input characters.

S706: the screen-transmission sending end prompting the eligible screen-transmission code.

Here, "an eligible screen-transmission code" is the candidate screen-transmission code containing the input characters as described above. Optionally, the screen-transmission sending end displays candidate screen-transmission codes in the form of a list.

S707: the user pressing the return key (for example, the Enter key on the keyboard).

S708: in response to the user pressing the return key (for example, the Enter key on the keyboard), the screen-transmission sending end complementing the screen-transmission code in the input box, that is, displaying the target screen-transmission code in the input box.

S709: the screen-transmission sending end accessing the local area network according to the network parameters carried by the beacon.

S710: the screen-transmission sending end parsing the target screen-transmission code to obtain the IP address of the screen-transmission receiving end.

S711: the screen-transmission sending end establishing a connection with the screen-transmission receiving end.

S712: the user clicking the screen transmission.

S713: in response to receiving the operation of the user clicking the screen transmission, performing transmission of screen transmission data between the screen-transmission sending end and the screen-transmission receiving end.

For example, the user clicks a screen transmission control on a screen transmission application interface displayed on the screen-transmission sending end, and when detecting a click operation of the user, the screen-transmission sending end responds to the click operation and sends the screen transmission data to the screen-transmission receiving end.

Figure 8:
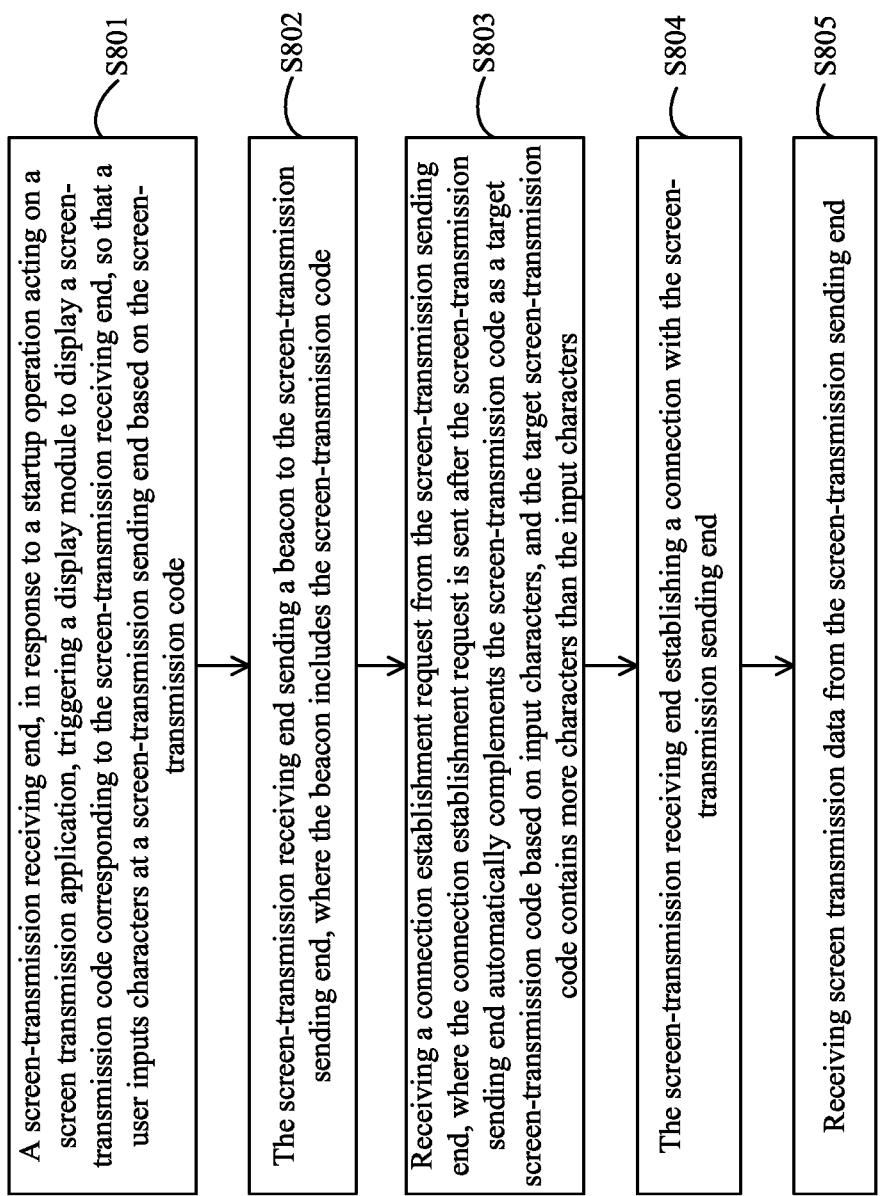
FIG. 8 is a flowchart of an information processing method according to another embodiment of the present disclosure.

As described earlier, the screen-transmission receiving end is installed with a screen transmission application, and when the user starts the screen transmission application, as shown in FIG. 8, the screen-transmission receiving end performs the following operations:

S801: the screen-transmission receiving end, in response to a startup operation acting on a screen transmission application, triggering a display module to display a screen-transmission code corresponding to the screen-transmission receiving end, so that a user inputs characters at a screen-transmission sending end based on the screen-transmission code.

For example, as described earlier, the screen-transmission receiving end may be the interactive white board shown in FIG. 1a, which is installed with the screen transmission application and integrated with reception and display functions. In this scenario, the display module is integrated in the interactive white board, or the screen-transmission receiving end may be two mutually independent apparatus, i.e., a receiving apparatus B2 and a display apparatus B1 shown in FIG. 1c, where the receiving apparatus is installed with a screen transmission application, and the display apparatus is configured to display a screen. In this scenario, the step specifically includes: the receiving apparatus B2 triggering the display apparatus B1 to display the screen-transmission code corresponding to the screen-transmission receiving end in response to the startup operation acting on the screen transmission application. That is, the display module is the display apparatus B1.

S802: the screen-transmission receiving end sending a beacon to the screen-transmission sending end, where the beacon includes the screen-transmission code.

S803: receiving a connection establishment request from the screen-transmission sending end, where the connection establishment request is sent after the screen-transmission sending end automatically complements the screen-transmission code as a target screen-transmission code based on input characters, and the target screen-transmission code contains more characters than the input characters.

For the related description of the screen-transmission sending end automatically complementing the screen-transmission code based on input characters therein, reference may be made to the embodiment corresponding to FIG. 2, which will not be repeated here.

Specifically, based on a service discovery technology, the screen-transmission receiving end multicasts or broadcasts information (containing a screen-transmission code) of the screen-transmission receiving end through the beacon, and floods the screen-transmission code of the screen-transmission receiving end to the screen-transmission sending end. Accordingly, after receiving the beacon, the screen-transmission sending end buffers the screen-transmission code contained in the beacon, so that the user can quickly match the target screen-transmission code when inputting characters.

Through the service discovery protocol, the screen-transmission sending end can know apparatus information of the screen-transmission receiving end in advance, such as the screen-transmission code, the IP address, etc. Therefore, when the user inputs a small number of characters, the screen-transmission sending end can filter out eligible apparatus without manually inputting a complete and complex screen-transmission code by the user, thereby improving the input efficiency of the screen-transmission code.

S804: the screen-transmission receiving end establishing a connection with the screen-transmission sending end.

S805: receiving screen transmission data from the screen-transmission sending end.

An information processing method of the embodiment of the present disclosure displays a screen-transmission code in response to a startup operation acting on the screen transmission application, and sends the screen-transmission code to the screen-transmission sending end by the beacon, so that the screen-transmission sending end determines that the screen-transmission code of the screen-transmission receiving end is the target screen-transmission code according to user's first operation, and displays the target screen-transmission code in the input box of the screen transmission application, thereby realizing rapid and accurate input of the screen-transmission code.

In addition, since the screen-transmission code is input rapidly and accurately at the screen-transmission sending end, the transmission delay of the screen transmission data can also be reduced in the embodiment of the present disclosure.

In addition, as described earlier, the check may be performed at the screen-transmission sending end, or may be performed at the screen-transmission receiving end. When the check is performed at the screen-transmission sending end, if the check passes, the screen-transmission sending end sends the screen transmission data to the screen-transmission receiving end. When the check is performed at the screen-transmission receiving end, the screen-transmission receiving end receives the screen transmission data from the screen-transmission sending end, which may further include the following steps:

receiving the target screen-transmission code from the screen-transmission sending end;

checking the target screen-transmission code to obtain a check result of whether a check passes;

sending the check result to the screen-transmission sending end; and if the check result is that the check passes, receiving the screen transmission data from the screen-transmission sending end.

The screen-transmission sending end therein sends the screen transmission data to the screen-transmission sending end only when the check result is that the check passes.

In some embodiments, checking the target screen-transmission code to obtain the check result of whether the check passes may include: if the target screen-transmission code is the screen-transmission code of the screen-transmission receiving end, the check result is that the check passes; if the target screen code is not the screen-transmission code of the screen-transmission receiving end, the check result is that the check does not pass.

Furthermore, if the screen-transmission sending end does not match the target screen-transmission code based on the input characters (at this point, it may be because a network administrator has disabled the service discovery technology), the user needs to continue to input the remaining characters, and after waiting for the user to input a complete target screen-transmission code, the screen-transmission sending end parses an IP address of the screen-transmission receiving end according to the target screen-transmission code, and searches the local area network to determine whether the IP address exists. If the IP address exists in the local area network, the screen-transmission sending end establishes a connection with the screen-transmission receiving end, and performs a screen transmission processing; or, if the IP address does not exist, the connection between the screen-transmission sending end and the screen-transmission receiving end fails, and the screen transmission processing cannot be performed.

In addition, considering information security and other factors, in order to avoid mistakenly projecting the screen picture of the screen-transmission sending end to other screen-transmission receiving ends (i.e., non-target screen-transmission receiving ends), in this case, before the screen-transmission sending end displays the target screen-transmission code in the input box in response to a second operation acting on the target screen-transmission code, the information processing method may further include: determining that the number of candidate screen-transmission codes is one. That is, only when the number of candidate screen-transmission codes is one, the user can perform selection input, otherwise manual input is still required.

In summary, embodiments of the present disclosure have at least the following advantages:

First, the user can complete automatic complementation and screen projection of the screen-transmission code without judging whether the screen-transmission sending end is in the same local area network as the screen-transmission receiving end;

Second, only when the prefix of the input screen-transmission code is correct and unique, automatic complementation of the screen-transmission code is performed, so as to ensure that the user knows which apparatus is the screen-transmission receiving end;

Third, only when the prefix of the input screen-transmission code is correct and unique, automatic complementation of the screen-transmission code is performed, so as to ensure that the user performs screen transmission only when he/she can see the screen-transmission code of the screen-transmission receiving end, thereby avoiding the malicious operation in which the user directly performs screen transmission without seeing the screen-transmission receiving end.

The following is the device embodiment of the present disclosure, which can be used to execute the above method embodiment of the present disclosure. For details not disclosed in the device embodiment of the present disclosure, reference may be made to the above method embodiment of the present disclosure.

Figure 9:
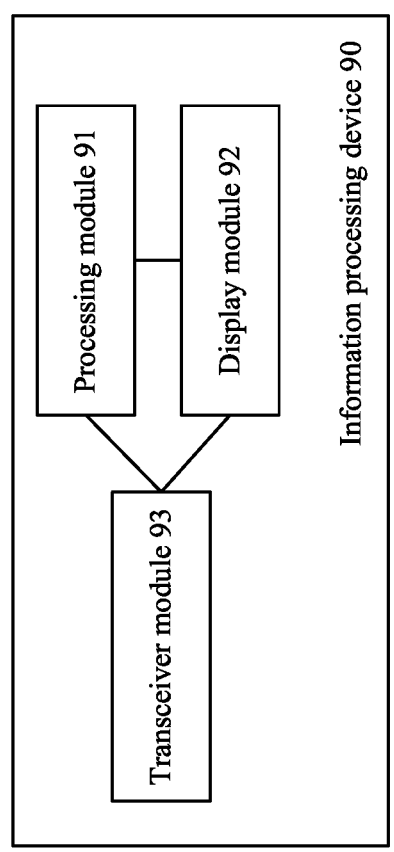
FIG. 9 is a schematic diagram of structures of an information processing device according to an embodiment of the present disclosure.

FIG. 9 is a schematic diagram of structures of an information processing device according to an embodiment of the present disclosure. The information processing device may be implemented by software and/or hardware. In practical applications, the information processing device may be integrated in the screen-transmission sending end as described earlier.

As shown in FIG. 9, the information processing device 90 includes: a processing module 91, a display module 92, and a transceiver module 93.

The processing module 91 is configured to trigger the display module 92 to display characters in an input box of a screen transmission application in response to a first operation acting on the characters, and to determine a target screen-transmission code in candidate screen-transmission codes stored in the screen-transmission sending end according to input characters, where the target screen-transmission code contains more characters than the input characters, the target screen-transmission code includes the input characters, the target screen-transmission code is a screen-transmission code of a screen-transmission receiving end, and the target screen-transmission code is acquired by the screen-transmission sending end from a beacon received from the screen-transmission receiving end.

The display module 92 is further configured to display the target screen-transmission code in the input box.

The processing module 91 is further configured to parse the target screen-transmission code to obtain an IP address of the screen-transmission receiving end, and is configured to establish a connection with the screen-transmission receiving end according to the IP address.

The transceiver module 93 is configured to send screen transmission data to the screen-transmission receiving end.

In some embodiments, the processing module 91 determining the target screen-transmission code in the candidate screen-transmission codes stored in the screen-transmission sending end according to the input characters may specifically include: when the number of candidate screen-transmission codes containing the input characters in the candidate screen-transmission codes stored in the screen-transmission sending end is one, determining that the candidate screen-transmission code containing the input characters is the target screen-transmission code.

Alternatively, the processing module 91 determining the target screen-transmission code in the candidate screen-transmission codes stored in the screen-transmission sending end according to the input character may specifically include: displaying at least one of the candidate screen-transmission codes containing the input characters in the candidate screen-transmission codes stored in the screen-transmission sending end, where the at least one candidate screen-transmission code includes the target screen-transmission code; and determining the target screen-transmission code in response to a second operation acting on the target screen-transmission code.

Optionally, the processing module 91 is further configured to determine a candidate screen-transmission code according to the input characters and an input order of the input characters before the display module 92 displays the at least one candidate screen-transmission code containing the input characters in the candidate screen-transmission codes stored in the screen-transmission sending end.

In some embodiments, the processing module 91 determining the candidate screen-transmission code according to the input character and the input order of the input characters may specifically include: determining a character string according to the input characters and the input order of the input characters; and determining that a screen-transmission code containing the character string in the candidate screen-transmission codes stored in the screen-transmission sending end is the candidate screen-transmission code containing the input characters.

Furthermore, the transceiver module 93 is further configured to access a local area network according to a network parameter carried by the beacon after receiving the beacon from the screen-transmission receiving end, where the network parameter includes a SSID, a password, and so on.

In some embodiments, the beacon carries an IP address of the screen-transmission receiving end. At this point, the transceiver module 93 sending the screen transmission data to the screen-transmission receiving end may specifically include: after obtaining the IP address of the screen-transmission receiving end, comparing the IP address of the screen-transmission receiving end and the IP address of the screen-transmission receiving end carried by the beacon to determine whether they are the same; if so, sending the screen transmission data to the screen-transmission receiving end. In this implementation, the screen-transmission sending end checks whether an IP address obtained based on the target screen-transmission code is the IP address of the screen-transmission receiving end.

In some embodiments, the transceiver module 93 sending the screen transmission data to the screen-transmission receiving end may specifically include: sending the target screen-transmission code to the screen-transmission receiving end to obtain a check result of the target screen-transmission code; and if the check result is that a check passes, sending the screen transmission data to the screen-transmission receiving end. In this implementation, the screen-transmission receiving end checks whether the target screen-transmission code from the screen-transmission sending end is the screen-transmission code of the screen-transmission receiving end.

An information processing device of the embodiment of the present disclosure is configured to: display characters in an input box in response to a first operation acting on the characters; determine a target screen-transmission code in candidate screen-transmission codes stored in the screen-transmission sending end according to input characters, where the target screen-transmission code contains more characters than the input characters, the target screen-transmission code contains the input characters, the target screen-transmission code is a screen-transmission code of a screen-transmission receiving end, and the target screen-transmission code is acquired by the screen-transmission sending end from a beacon received from the screen-transmission receiving end; display the target screen-transmission code in the input box; parse the target screen-transmission code to obtain an IP address of the screen-transmission receiving end; establish a connection with the screen-transmission receiving end according to the IP address; and send screen transmission data to the screen-transmission receiving end. In one aspect, according to the present disclosure, the target screen-transmission code can be determined when a user inputs first N characters of the target screen-transmission code, and the first N characters of the target screen-transmission code are displayed in the input box, where N is less than the number of characters contained in the target screen-transmission code, thereby realizing rapid and accurate input of the screen-transmission code. In another aspect, since the screen-transmission receiving end transmits the screen-transmission code of the screen-transmission receiving end to the screen-transmission sending end through the beacon, the user does not need to judge whether the screen-transmission sending end and the screen-transmission receiving end are in the same local area network, that is, even if the screen-transmission sending end and the screen-transmission receiving end are not in the same local area network, the screen-transmission code can be automatically complemented at the screen-transmission sending end. In yet another aspect, the transmission delay of the screen transmission data can also be reduced in the embodiment of the present disclosure.

In addition, in practical applications, the information processing device shown in FIG. 9 may be integrated into the screen-transmission receiving end as described earlier. In that case:

The processing module 91 is configured to trigger the display module 92 to display a target screen-transmission code corresponding to the screen-transmission receiving end in response to a startup operation acting on a screen transmission application, so that a user inputs characters at a screen-transmission sending end based on the target screen-transmission code.

The transceiver module 93 is configured to: send a beacon to the screen-transmission sending end, where the beacon includes the screen-transmission code of the screen-transmission receiving end; and receive a connection establishment request from the screen-transmission sending end, where the connection establishment request is sent after the screen-transmission sending end automatically complements the target screen-transmission code based on input characters, and where the target screen-transmission code contains more characters than the input characters.

The processing module 91 is further configured to establish a connection with the screen-transmission sending end in response to receiving the connection establishment request.

The transceiver module 93 is further configured to receive screen transmission data from the screen-transmission sending end.

In some embodiments, the transceiver module 93 receiving the screen transmission data from the screen-transmission sending end may specifically include: receiving the target screen-transmission code from the screen-transmission sending end; checking the target screen-transmission code to obtain a check result of whether a check passes; sending the check result to the screen-transmission sending end; and if the check result is that the check passes, receiving the screen transmission data from the screen-transmission sending end, which includes audio data, video data, and/or the like.

An information processing device of the embodiment of the present disclosure is configured to: trigger a display module to display a screen-transmission code in response to a startup operation acting on a screen transmission application, so that a user inputs characters at a screen-transmission sending end based on the screen-transmission code; and send a beacon containing a screen-transmission code of a screen-transmission receiving end to the screen-transmission sending end, so that the screen-transmission sending end determines that a target screen-transmission code is the screen-transmission code according to user's first operation, and displays the target screen-transmission code in the input box, where the first operation is used to input characters contained in the target screen-transmission code in the input box of the screen transmission application, and the target screen-transmission code contains more characters than input characters, thereby realizing rapid and accurate input of the screen-transmission code, in addition, the transmission delay of the screen transmission data can be reduced in this embodiment of the present disclosure.

Figure 10:
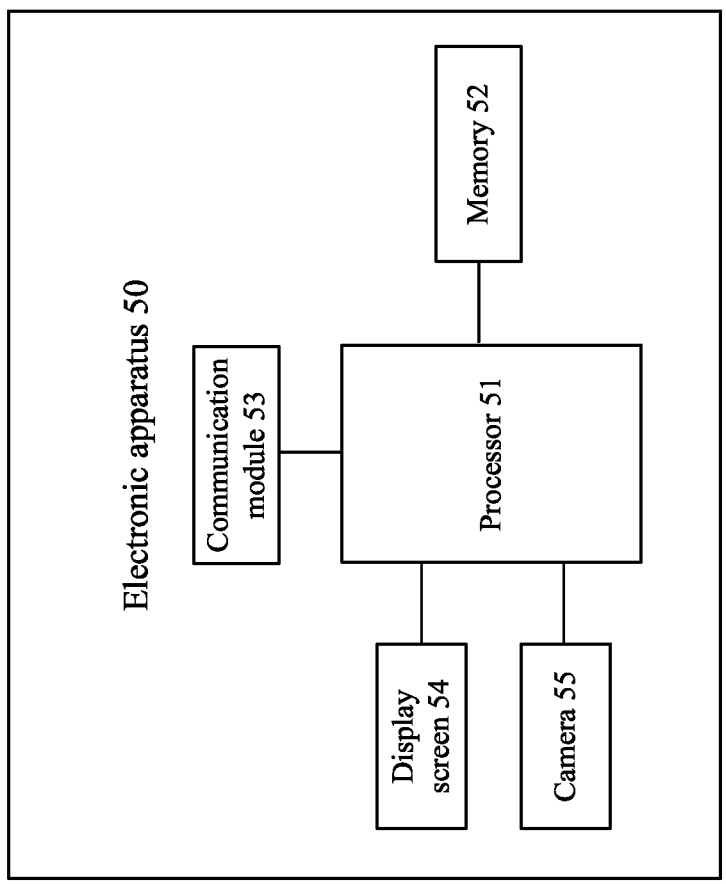
FIG. 10 is a schematic diagram of structures of an electronic apparatus according to an embodiment of the present disclosure.

FIG. 10 is a schematic diagram of structures of an electronic apparatus according to an embodiment of the present disclosure. As shown in FIG. 10, the electronic apparatus 50 includes: a processor 51, a memory 52 connected with the processor 51, a communication module 53, and a display screen 54.

The processor 51 may include one or more processing units. For example, the processor 51 may be a central processing unit (CPU), a digital signal processor (DSP), an application specific integrated circuit (ASIC), or the like. A general purpose processor may be a microprocessor, or may be any conventional processor or the like. Steps of the method disclosed in the present disclosure may be directly performed by a hardware processor or performed by a combination of hardware and software modules in the processor.

The memory 52 may be configured to store program instructions. The memory 52 may include a program storage area and a data storage area. The program storage area therein may store an operating system, an application program required by at least one function (such as a sound playing function), and the like. The data storage area may store data (such as audio data etc.) created during use of the electronic apparatus 50, and the like. Furthermore, the memory 52 may include a high-speed Random Access Memory (RAM), and may further include a non-volatile memory such as at least one disk storage device, a flash memory device, a universal flash storage (UFS), and the like. The processor 51 executes various functional applications of the electronic apparatus 50 and data processing by running program instructions stored in the memory 52.

The communication module 53 may provide a solution for wireless communication such as 2G/3G/4G/5G applied on the electronic apparatus 50. The communication module 53 may receive an electromagnetic wave by an antenna, perform processing such as filtering and amplification on the received electromagnetic wave, and transmit it to a modem processor for demodulation. The communication module 53 may also amplify a signal modulated by the modem processor, and convert it into an electromagnetic wave through the antenna for radiation. In some embodiments, at least a portion of the functional modules of the communication module 53 may be provided in the processor 51. In some embodiments, the at least a portion of the functional modules of the communication module 53 and at least a portion of the modules of the processor 51 may be provided in the same device.

The display screen 54 is configured to display a picture, such as an image, a video, or the like. The display screen 54 includes a display panel. The display panel may be a liquid crystal display (LCD), an organic light emitting diode (OLED), an active-matrix organic light emitting diode (AMOLED), a flex light emitting diode (FLED), a Mini-LED, a Micro-LED, a Micro-OLED, a quantum dot light emitting diode (QLED), or the like. The display panel may receive a touch operation input by a user through a finger or an input apparatus. The input apparatus therein includes, but not limited to, a stylus, an infrared stylus, and/or a capacitive stylus.

Optionally, the electronic apparatus 50 further includes a camera 55, and the like.

The camera 55 may capture an image or a video. For example, the camera 55 may capture a video under the control of the processor 51 and store the video in the memory 52.

It should be noted that the number of the memory 52 and the number of the processor 51 are not limited in this embodiment of the present disclosure and each may be one or more, and FIG. 10 illustrates one memory 52 and one processor 51 as an example. The memory 52 and the processor 51 may be wired or wirelessly connected in various ways, such as through a bus. In practical applications, the electronic apparatus 50 may be a computer, a mobile phone, a tablet, a PDA, an interactive white board, or the like.

The bus may be an Industry Standard Architecture (ISA) bus, a Peripheral Component Interconnect (PCI) bus, an Extended Industry Standard Architecture (EISA) bus, or the like. The bus can be divided into an address bus, a data bus, a control bus, and the like. For ease of illustration, the bus in the drawings of the present disclosure is not limited to only one bus or one type of bus.

The electronic apparatus of this embodiment may be configured to execute the technical solution in the above method embodiment, and its implementation principle and technical effect are similar, which are not repeated here.

An embodiment of the present disclosure further provides a computer-readable storage medium, where the computer-readable storage medium stores program instructions that, when executed, implement the information processing method according to any one of the above embodiments.

An embodiment of the present disclosure provides a computer program product including program instructions that, when executed, implement the information processing method of any one of the above embodiments.

In the above embodiments, it should be understood that the disclosed apparatus and method may be implemented in other ways. For example, the apparatus embodiments described above are merely illustrative. For example, the division of the modules is merely a logical function division, and there may be other division modes in actual implementations, for example, a plurality of modules may be combined or integrated into another system, or some features may be ignored or not executed. In another aspect, the displayed or discussed mutual coupling or direct coupling or communication connection to one another may be performed via some interfaces, and the indirect coupling or communication connection to a device or module may be in electrical, mechanical or other form.

In addition, each functional module in various embodiments of the present disclosure may be integrated into one processing unit, or each module may exist physically independently, or two or more modules may be integrated into one unit. The unit integrated by the above modules may be implemented in the form of hardware or hardware plus software functional units.

The integrated module implemented in the form of a software functional module can be stored in a computer readable storage medium. The above software functional module is stored in a storage medium, and includes several instructions for causing a computer apparatus (which may be a personal computer, a server, a network apparatus, or the like) or a processor to perform some of the steps of the methods described in the various embodiments of the present disclosure.

The above storage medium may be implemented by any type of volatile or non-volatile storage apparatus or a combination thereof, such as a Static Random Access Memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium that can be accessed by a general purpose or special purpose computer.

Those of ordinary skill in the art will appreciate that all or part of the steps to implement the above method embodiments may be accomplished by hardware related to program instructions. The foregoing program may be stored in a computer readable storage medium. When the program is executed, the steps including the above method embodiments are executed. The foregoing storage medium includes various media that can store program codes, such as a ROM, a RAM, a magnetic disk, or an optical disk.

Finally, it should be noted that the above embodiments are merely intended to describe the technical solutions of the present disclosure and not to limit them; although the present disclosure is described in detail with reference to the foregoing embodiments, those of ordinary skill in the art should understand that the technical solutions described in the foregoing embodiments may still be modified, or some or all of the technical features thereof may be equivalently substituted; and these modifications or substitutions do not deviate the nature of the respective technical solutions from the scope of the technical solutions of the embodiments of the present disclosure.

What is claimed is:

1. An information processing method, applied to a screen-transmission sending end, comprising:
   in response to a first operation acting on characters, displaying the characters in an input box, wherein the input box is an input box of a screen transmission application;
   determining, according to input characters, a target screen-transmission code in candidate screen-transmission codes stored in the screen-transmission sending end,
      wherein the number of characters contained in the target screen-transmission code is greater than the number of the input characters,
      wherein the target screen-transmission code contains the input characters, and the target screen-transmission code is a screen-transmission code of a screen-transmission receiving end, and
      wherein the target screen-transmission code is acquired by the screen-transmission sending end from a beacon received from the screen-transmission receiving end; displaying the target screen-transmission code in the input box;
   parsing the target screen-transmission code to obtain an IP address of the screen-transmission receiving end;
   establishing a connection with the screen-transmission receiving end according to the IP address; and
   sending screen transmission data to the screen-transmission receiving end;
   wherein sending the screen transmission data to the screen-transmission receiving end comprises:
      sending the target screen-transmission code to the screen-transmission receiving end to obtain a check result of the target screen-transmission code; and
      if the check result is that a check passes, sending the screen transmission data to the screen-transmission receiving end.

2. The information processing method according to claim 1, wherein determining the target screen-transmission code in the candidate screen-transmission codes stored in the screen-transmission sending end according to the input characters comprises:
  if the number of candidate screen-transmission codes containing the input characters in the candidate screen-transmission codes stored in the screen-transmission sending end is one, determining that the candidate screen-transmission code containing the input characters is the target screen-transmission code.

3. The information processing method according to claim 1, wherein determining the target screen-transmission code in the candidate screen-transmission codes stored in the screen-transmission sending end according to the input characters comprises:
  displaying at least one of the candidate screen-transmission codes containing the input characters in the candidate screen-transmission codes stored in the screen-transmission sending end, wherein the at least one candidate screen-transmission code comprises the target screen-transmission code; and
  in response to a second operation acting on the target screen-transmission code, determining the target screen-transmission code.

4. The information processing method according to claim 3, wherein before displaying the at least one candidate screen-transmission code containing the input characters in the candidate screen-transmission codes stored in the screen-transmission sending end, the method further comprises:
  determining a character string according to the input characters and an input order of the input characters; and
  determining that a screen-transmission code containing the character string in the candidate screen-transmission codes stored in the screen-transmission sending end is the candidate screen-transmission code containing the input characters.

5. The information processing method according to claim 1, further comprising:
  after receiving the beacon, accessing a local area network according to a network parameter carried by the beacon, wherein the network parameter comprises a service set identifier SSID and a password.

6. The information processing method according to claim 1, wherein carrying an IP address of the screen-transmission receiving end by the beacon and sending the screen transmission data to the screen-transmission receiving end comprise:
  after obtaining the IP address of the screen-transmission receiving end, comparing the IP address of the screen-transmission receiving end and the IP address of the screen-transmission receiving end carried by the beacon to determine whether they are the same; and
  if so, sending the screen transmission data to the screen-transmission receiving end.

7. An information processing method, applied to a screen-transmission receiving end, comprising:
  in response to a startup operation acting on a screen transmission application, triggering a display module to display a screen-transmission code corresponding to the screen-transmission receiving end, so that a user inputs characters at a screen-transmission sending end based on the screen-transmission code;
  sending a beacon to the screen-transmission sending end, wherein the beacon comprises the screen-transmission code;
  in response to receiving a connection establishment request from the screen-transmission sending end, establishing a connection with the screen-transmission sending end, wherein the connection establishment request is sent after the screen-transmission sending end automatically complements the screen-transmission code as a target screen-transmission code based on input characters, and the number of characters contained in the target screen-transmission code is greater than the number of the input characters; and
  receiving screen transmission data from the screen-transmission sending end;
  wherein receiving the screen transmission data from the screen-transmission sending end comprises:
    receiving the target screen-transmission code from the screen-transmission sending end; checking the target screen-transmission code to obtain a check result of whether a check passes;
    sending the check result to the screen-transmission sending end; and
    if the check result is that the check passes, receiving the screen transmission data from the screen-transmission sending end.

8. A computer-readable storage medium characterized in that it stores program instructions, and the program instructions, when executed, implement an information processing method, wherein the information processing method is applied to a screen-transmission sending end and comprises:
  in response to a first operation acting on characters, displaying the characters in an input box, wherein the input box is an input box of a screen transmission application;
  determining, according to input characters, a target screen-transmission code in candidate screen-transmission codes stored in the screen-transmission sending end,
    wherein the number of characters contained in the target screen-transmission code is greater than the number of the input characters,
    wherein the target screen-transmission code contains the input characters, and the target screen-transmission code is a screen-transmission code of a screen-transmission receiving end, and
    wherein the target screen-transmission code is acquired by the screen-transmission sending end from a beacon received from the screen-transmission receiving end;
  displaying the target screen-transmission code in the input box;
  parsing the target screen-transmission code to obtain an IP address of the screen-transmission receiving end;
  establishing a connection with the screen-transmission receiving end according to the IP address; and
  sending screen transmission data to the screen-transmission receiving end;
  wherein sending the screen transmission data to the screen-transmission receiving end comprises:
    sending the target screen-transmission code to the screen-transmission receiving end to obtain a check result of the target screen-transmission code; and if the check result is that a check passes, sending the screen transmission data to the screen-transmission receiving end.

* * * * *